No. 751,088. PATENTED FEB. 2, 1904.
L. G. MACAULEY.
SHACKLE AND TAIL HOLDER FOR COWS.
APPLICATION FILED JUNE 3, 1903.
NO MODEL.
Fig. 1.
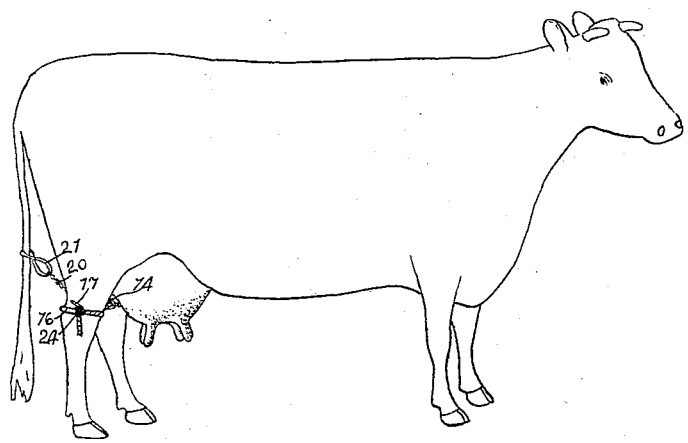
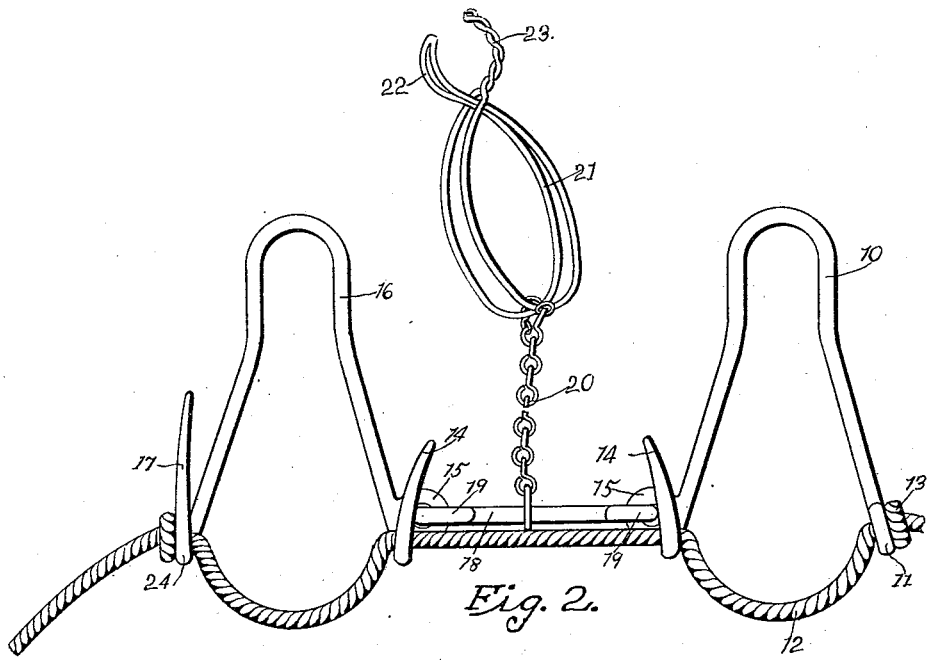
Fig. 2.
Witnesses.
K. K. Keffer
C. G. Hague
Inventor, L. G. Macauley.
by Orwig & Lane attys No. 751,088. Patented February 2, 1904.

UNITED STATES PATENT OFFICE.

LORENZO G. MACAULEY, OF MALCOM, IOWA.

SHACKLE AND TAIL-HOLDER FOR COWS.

SPECIFICATION forming part of Letters Patent No. 751,088, dated February 2, 1904.

Application filed June 3, 1903. Serial No. 159,871. (No model.)

*To all whom it may concern:*

Be it known that I, LORENZO G. MACAULEY, a citizen of the United States, residing at Malcom, in the county of Poweshiek and State of Iowa, have invented certain new and useful Improvements in Shackles and Tail-Holders for Cows, of which the following is a specification.

The objects of my invention are to provide an improved shackle of simple, durable, and inexpensive construction especially designed for use in holding the legs of milch-cows in such position that they cannot kick while being milked and also to provide a device in the nature of an attachment to hold the animal's tail in position, so that it cannot switch around and interfere with the person milking the cow.

My invention is especially designed for use in connection with young cows or cows having acquired the habit of kicking while being milked, and I have found that if my improved shackle is applied to animals of this class they will soon become broken in and accustomed to stand quietly while being milked, and thereafter the shackle may be dispensed with and the animals will stand quietly.

More specifically it is my object to provide a device of this class that may be readily, quickly, and easily applied to animals of different sizes and when once applied will firmly hold the animal's legs as required to prevent them from kicking and yet will permit of sufficient movement of the animal's legs to enable the animal to acquire an easy and comfortable position while standing.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows my improved shackle and tail-holder applied to a milch-cow, and Fig. 2 shows a top or plan view of the complete device with the rope for securing the shackles to the animal's legs.

Referring to the accompanying drawings, it will be noted that the first shackle (indicated by the reference-numeral 10) is substantially U-shaped, the end portions thereof being slightly divergent. This piece is made of metal, and in one end is a loop 11, through which the rope 12 is passed, said rope being provided with a knot at 13 to prevent it sliding through the loop 11 in one direction. The other end of the part 10 is provided with a pointed hook 14 and also with an eye 15. The reference-numeral 16 indicates the other shackle, which is an exact counterpart of the shackle first described except that instead of the loop 11 I have provided a hook 17 substantially the same as the hooks 14.

The reference-numeral 18 indicates a rod having loops 19 in its ends connected with the eyes 15 of the adjacent shackle. This rod is for the purpose of connecting the two shackle members and at the same time preventing them from moving toward each other.

The reference-numeral 20 indicates a chain attached to the rod 18 to support a tail-holder. This tail-holder is made of a single piece of spring-wire, the handle portion being indicated by the reference-numeral 21, and one end portion 22 is projected through one part of the handle portion, and the other end 23 is twisted together and shaped to form with the part 22 an open ring. The resiliency of the spring-wire tends to force the parts 22 and 23 together, and these parts may be separated readily when the operator squeezes the handle portion together. On the opposite end portion of the rope 12 I have provided a knot 24 for purposes hereinafter made clear.

In practical use the operator first approaches the cow to be milked and seats himself upon a stool in position required for milking. He then places the shackle 10 over the cow's hind leg farthest from the operator and slips it over the back of the leg above the knee-joint. He then draws the rope 12 in front of the animal's leg and places it in the hook 14. He then holds the rope tight in one hand and places the other shackle 16 over the other leg immediately above the knee-joint and then places the rope 12 in the hook 14 of the shackle 16, and he then passes the rope in front of the animal's leg and finally through the hook 17. The knot 24 will then lie close to the outer face of the hook 17, thus holding the rope tight.

In use the operator may, if desired, provide a number of knots in the rope, so that the device will be adapted for animals of different sizes, or, if desired, he may tie the end of the rope 12 to the hook 17. Then he grasps the handle of the tail-holder, thus forcing the parts 22 and 23 away from each other. He then places the parts 22 and 23 around the cow's tail, and when the handle is released these parts move together and firmly grip the tail between them. Obviously the animal may move its legs a slight distance, so that it may assume a comfortable position on account of the movement of the shackles permitted by the rod 18. However, no movement of the animal's legs will permit the rope 12 to slacken, because the said rod 18 is rigid and will prevent the shackles moving toward each other. The peculiar shape of the body portions of the shackles will prevent the device from sliding downwardly over the cow's knees, and it will be firmly and securely held in position and yet may be readily attached to or disconnected from an animal's legs by a person in position to milk the animal, and the operation of attaching the shackles and tail-holder and of detaching them may be done very quickly and easily, and when the shackles are in position the animal is positively prevented from kicking, and in most cases after the shackles have been applied several times the animal will not struggle and will soon become broken of the habit of kicking and struggling while being milked.

Having thus described my invention, what I claim, and desire to secure by Letters Patent of the United States therefor, is—

1. In a device of the class described, the combination of two substantially U-shaped shackles, a rod pivoted to both and a rope secured to one end of one of the shackles and detachably connected with the remaining ends of the shackles.

2. In a device of the class described, the combination of two substantially U-shaped shackles, one shackle having a loop at one end and a hook at the other end, the other shackle having a hook at each end, a rod pivoted to the adjacent ends of the shackles, and a rope attached to the loop and capable of entering the said hooks.

3. In a device of the class described, the combination of two substantially U-shaped shackles, a rod pivoted to each, and a rope secured to one end of one of the shackles and detachably connected with the remaining ends of the shackle, and a tail-holder attached to said rod.

4. In a device of the class described, the combination of a substantially U-shaped part 10 having a loop 11 at one end and a hook 14 and an eye 15 at its other end, a mating part having a hook 14 and an eye 15 at one end, and a hook 17 at its other end, a rigid rod 18 having loops 19 at its ends passed through the eyes 15, a rope 12 secured to the loop 11 and designed to pass through the hooks 14 and 17 and having a knot 24 to lie against the outer surface of the hook 17, a chain 20 hooked with the rod 18, and a tail-holder connected with the chain 20.

5. In a device of the class described, the combination of two shackles shaped to pass over a cow's hind legs above the knee-joint, and shaped to prevent downward movement when thus placed, means for holding the shackles away from each other, and a rope connected with both ends of each shackle and designed to be passed around in front of the animal's legs, for the purposes stated.

LORENZO G. MACAULEY.

Witnesses:
H. E. BOYD,
GEORGE L. SCOVILL.